United States Patent [19]

Izumisawa et al.

[11] 3,919,712

[45] Nov. 11, 1975

[54] COLOR SIGNAL CONTROL SYSTEM FOR COLOR TELEVISION RECEIVERS

[75] Inventors: Masato Izumisawa, Yokosuka; Senri Miyaoka, Fujisawa, both of Japan

[73] Assignee: Sony Corporation, Tokyo, Japan

[22] Filed: Feb. 25, 1974

[21] Appl. No.: 445,238

[30] Foreign Application Priority Data

Feb. 27, 1973 Japan .............................. 48-23425

[52] U.S. Cl. ....................... 358/27; 358/29; 358/40

[51] Int. Cl.² ..................... H04N 9/20; H04N 9/537

[58] Field of Search ........................... 358/27, 29, 40

[56] References Cited

UNITED STATES PATENTS 3,109,887 11/1963 Bradley ................................ 358/27

FOREIGN PATENTS OR APPLICATIONS 1,762,929 12/1970 Germany ............................ 358/27

*Primary Examiner*—Robert L. Richardson

*Attorney, Agent, or Firm*—Lewis H. Eslinger; Alvin Sinderbrand

[57] ABSTRACT

A signal control system for controlling the level of color signals to modulate the density of the electron beams in a color cathode ray tube having an array of phosphors that emit light of different colors, and in which at least one of the phosphors has a luminosity saturation characteristic that is different from the others. The system includes means to limit the peak signals applied to control the beam that strikes the phosphor least subject to saturation, the purpose being to prevent that phosphor from being excited beyond the level at which the other phosphors can maintain a balanced degree of luminescence.

6 Claims, 4 Drawing Figures

COLOR SIGNAL CONTROL SYSTEM FOR COLOR TELEVISION RECEIVERS

BACKGROUND OF THE INVENTION

1. Field of the Invention

This invention relates generally to a system for controlling color signals applied to a color cathode ray tube so that the light emitted will have a balanced color content. In particular, the invention relates to a control system to modulate the electron beams in a color cathode ray tube so that color deterioration of the images is prevented by modulating the beams to equalize the luminosity saturation characteristics of the different color phosphors.

2. The Prior Art

In color television receivers or the like that utilize a color cathode ray tube having a screen made up of a plurality of groups of phosphors, each type of phosphor emitting light of a specific color, a correct balance must be maintained between the intensity of light emitted by the different phosphors in response to a given electron beam density in order to produce an image that correctly reproduces the colors of the original object. Different phosphors have different degrees of efficiency in emitting light in response to electron beams excitation, and this is likely to be especially noticeable at high levels of brightness. Phosphors that emit light of certain colors saturate at lower levels of excitation than phosphors that emit light of other colors. Saturation means that increasing the intensity of the electron beam striking the phosphor will not substantially increase the intensity of light emitted by the phosphor.

In particular, the phosphors to emit green and blue light in present day color cathode ray tubes become saturated at a substantially lower electron beam intensity than the phosphor that emits red light. If the electron beams directed to all three of these phosphors are modulated so that their densities increase equally, a level will be reached at which the green and blue light will be saturated, and further increase of electron beam density will cause the image to take on a reddish casr due to the fact that the phosphor that emits red light can respond to higher beam densities with greater light output. Such an image could not be balanced merely by decreasing the intensity of the electron beam directed to the red phosphor areas because, at low levels of density, the image would have a deficiency of red light.

The lack of equality of luminosity saturation also produces an improper color shading in cathode ray tubes having wide beam deflection angles. In such tubes, the electron beams must pass through a magnetic deflection field that is likely to have an electron optical distortion, commonly in the form of a barrel-shaped field or a modification thereof. Such a field may be necessary to produce correct beam convergence over the wide deflection angle, but it causes the beam spots on the screen to form different shapes at different areas. In the central part of the screen, the beam spot is substantially circular, but at the sides of the image area, the beam spot is oval-shaped with its long diameter in the direction of the scanning line, which is in the horizontal direction in standard color cathode ray tubes. Since the beam contains the same number of electrons at the side of the screen as at the center, the compression of the spot in the vertical direction means that the electron density along the direction of the short diameter of the oval is increased. This increase causes an increase in excitation of the phosphors at the edges of the screen, and since the red phosphors can respond to increased excitation by producing increased light, the image takes on a reddish cast at the sides of the image area. Accordingly, even if the colors are properly balanced in the central region of the image, they may be unbalanced at the left and right sides.

SUMMARY OF THE INVENTION

In accordance with the present invention a signal control system is provided for controlling the level of color signals applied to a color cathode ray tube. The effect is to modulate the density of the electron beams to maintain a substantially balanced luminosity of the different color luminescenses from the respective color phosphors may saturate at a higher beam density level then the other phosphor or phosphors. The control system includes means to detect a signal that would control the intensity of light emitted by the phosphor least subject to saturation. The signal to be detected may be the color signal or the luminance signal that, together with chrominance signals, composes the color signal. The detected signal is used to control the amplitude of the peak portion of the signal that would normally saturate least easily.

Therefore, it is one object of the present invention to provide a color signal control system for producing on a color phosphor screen an image having improved color balance without affecting luminosity saturation of the color phosphors.

Another object of the invention is to provide a color signal control system for controlling the level of color signals applied to a color cathode ray tube so as to prevent any deterioration in the image due to differences between the luminosity saturation characteristics of different color phosphors of the tube.

A further object of the invention is to provide a color signal control system for the type of color television receiver employing a wide beam deflection angle color cathode ray tube subject to color deterioration at the sides of the screen due to differences between luminosity saturation characteristics of color phosphors used in the screen.

Further objects will become apparent from studying the following specification and drawings.

DETAILED DESCRIPTION OF THE INVENTION

Figure 1:
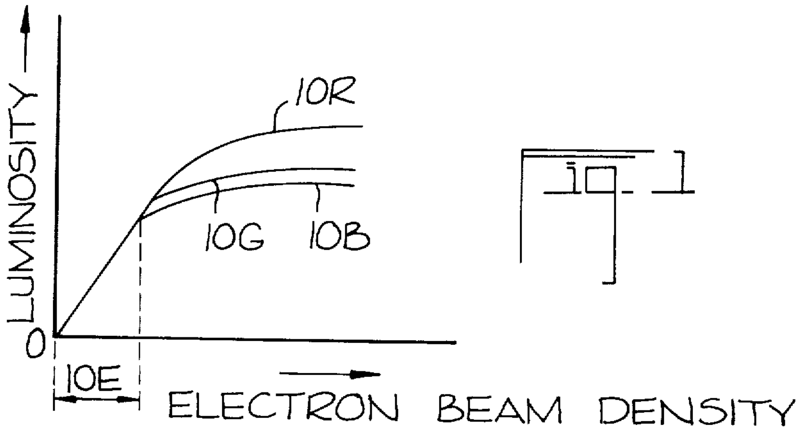
FIG. 1 is a graph showing characteristic curves of luminosity variation of different color phosphors in relation to the density of an electron beam impinging on the phosphors.

FIG. 1 is a graph showing luminosity curves of different phosphors as a function of electron beam density. The curves are identified by the reference characters 10R and 10B and 10G corresponding to phosphors that emit red, blue, and green light, respectively. Within a range 10E that begins at zero electron beam density and zero luminosity, the luminosity of all three types of phosphors increases linearly with an increase in electron beam density. However, as the electron beam density exceeds the range 10E, the blue phosphor and, to a slightly lesser extent, the green phosphor begin to saturate so that a further increase in density of the electron beams striking those phosphors produces a smaller and smaller increase in luminosity. However, the red phosphor does not begin to saturate until the electron beam density is considerably beyond the range 10E, and thus the light emitted by a unit area of such phosphor continues to increase in intensity much more than the increase of light from a corresponding area of either the blue or the green phosphor for a corresponding increase in electron beam density. Eventually, even the red phosphor becomes saturated. Thus, the blue and green color phosphors represented by the curves 10B and 10G in FIG. 1 are relatively easy to saturate in terms of luminosity versus electron beam density, and the red phosphor represented by the curve 10R is significantly more difficult to saturate.

Figure 2:
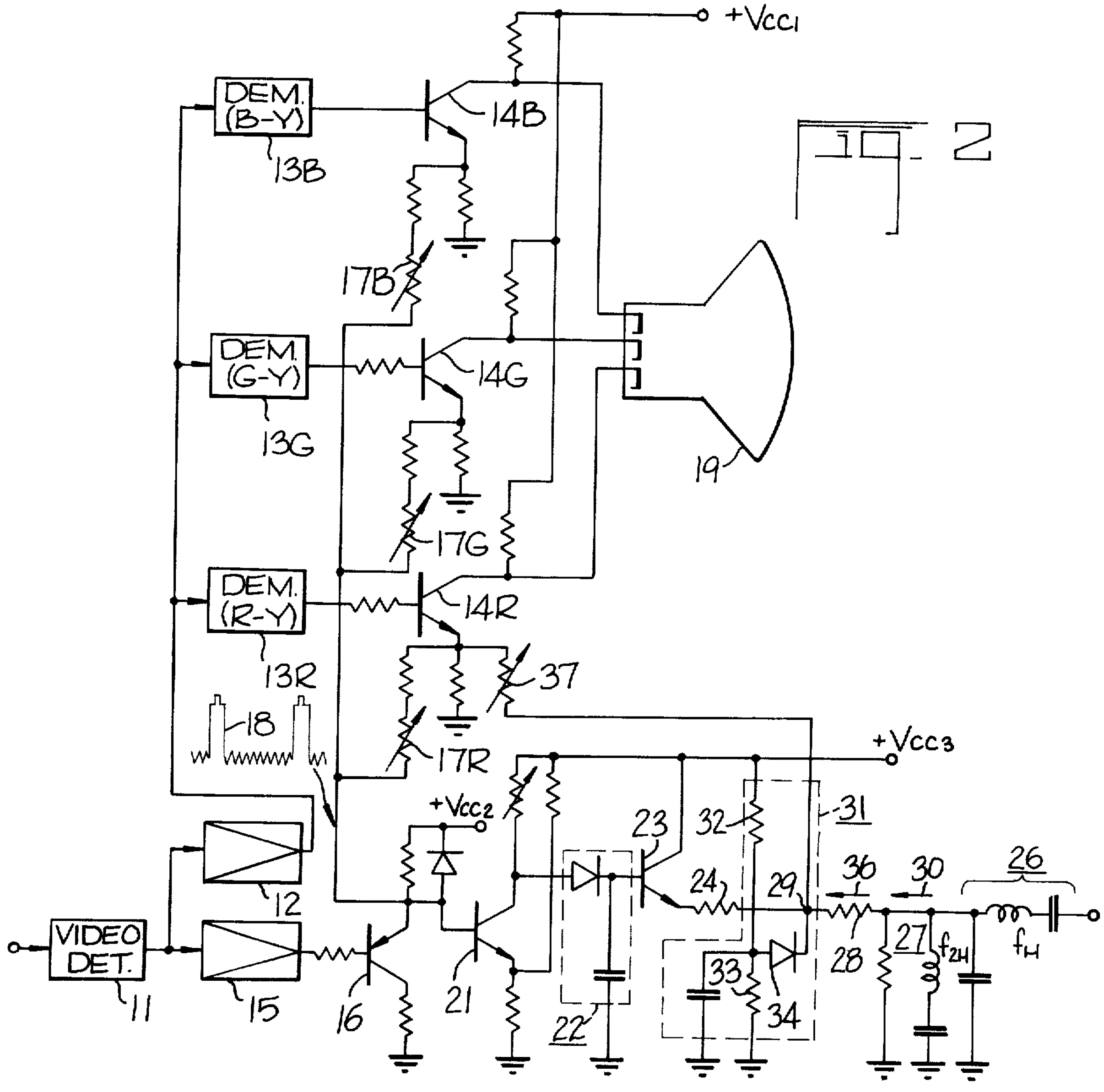
FIG. 2 is a schematic circuit diagram showing one embodiment of a color signal control system according to the present invention.

FIG. 2 shows a circuit diagram of a system for compensating for the difference in luminosity saturation of different phosphors. This circuit is particularly arranged to compensate for the difference in luminosity saturation of the type of phosphors represented by the graphs in FIG. 1. The system shown in FIG. 2 is only part of a complete color television receiver or monitor, and it is to be understood that the parts not shown are of standard construction.

In FIG. 2 a signal is applied to a video detector 11, the output of which is connected to a band pass amplifier 12 that includes a circuit through which the chrominance portion of the composite video signal passes. The band pass amplifier 12 is connected to three color demodulators 13B, 13G and 13R that produce, respectively, a B-Y color difference signal, a G-Y color difference signal, and an R-Y color difference signal to be applied to the bases of three output transistors 14B, 14G, and 14R, respectively. These transistors are connected to a suitable power supply terminal to be energized by a voltage $V_{cc1}$.

Another band pass amplifier 15 is also connected to the output of the video detector 11. The amplifier 15 is tuned to pass the luminance signal of the composite video signal, and its output is connected to the base of a PNP transistor 16 connected as an emitter follower. The emitter follower is energized by a power supply voltage $V_{cc2}$ to maintain the emitter electrode at the proper voltage level. The emitter output terminal of this transistor is connected by individual variable resistors 17B, 17G, and 17R to the respective emitters of the output transistors 14B, 14G, and 14R, so that the luminance signal 18 may be mixed with the respective color difference signals in the transistors 14B, 14G, and 14R. Thus, the output transistors 14B, 14G, and 14R also serve as matrixing transistors that produce primary color information signals by properly mixing the luminance signal with the respective color difference signals. The primary color signals from the collector electrodes to the matrixing output transistors 14B, 14G, and 14R are applied to respective cathodes of a cathode ray tube 19 that includes an array of phosphors on its screen to emit blue, green and red light when energized by beams originating at the three cathodes.

In this embodiment, the level of the luminance signal is detected to control the level of at least one of the primary color signals applied to one of the cathodes of the cathode ray tube 19. In this manner, the electron beam density of the spot produced by electrons from that cathode may be controlled relative to the electron beam densities of spots produced by the beams from the other cathodes in order to correct the differences in luminosity saturation of the different phosphors on the screen of the tube 19. For this purpose, the base of a transistor 21 is connected to the emitter of the emitter follower transistor 16, and a peak detector circuit 22 is connected to the collector output terminal of the transistor 21. The detector circuit 22 detects the peak level of the luminance signal and supplies the detected signal to another emitter follower transistor 23. This transistor has an output resistor 24 connected in series with its emitter.

The circuit also includes an input terminal 25 to which horizontal pulses, such as horizontal synchronizing pulses, are connected. The terminal 25 is connected in series with a first resonant circuit 26 tuned to the fundamental frequency $f_H$ of the horizontal synchronizing signal. A second resonant circuit 27, which is tuned to the second harmonic $f_{2H}$ of the horizontal synchronizing signal frequency, is connected to the output of the filter 26. A resistor 28 connects the output signal from the filters 26 and 27 to a connecting point 29 of a clipping circuit 31. The resistor 24 from the emitter follower 23 is also connected to the same connecting point 29.

The clipping circuit includes two resistors 32 and 33 connected as a voltage divider between ground and a suitable power supply terminal having a voltage $V_{cc3}$. A variable resistor 37 connects the connecting point 29 to the emitter of the output and matrixing transistor 14R.

Figure 3:
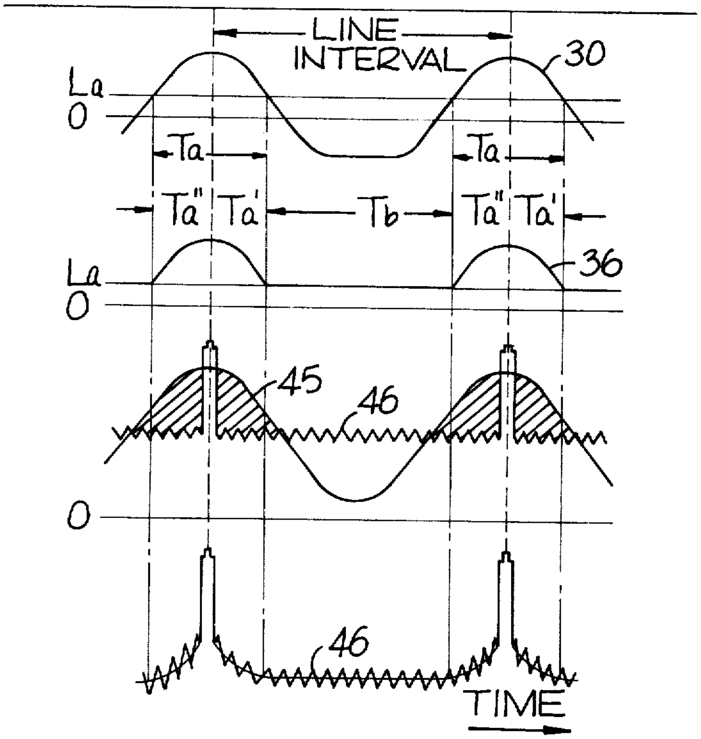
FIG. 3 is a graphic representation of waveforms used in explaining the circuit diagram of FIG. 2.

In the operation of the circuit in FIG. 2, as long as the detected peak level of the luminance signal as applied to the connecting point 29, is less than the voltage of the common circuit point between the resistors 32 and 33 of the voltage divider 31, the diode 34 will be conductive and will keep the voltage at the connecting point 29 fixed. The level at which this voltage is fixed is indicated in FIG. 3 as the level $L_o$. As long as this voltage remains fixed, the transistor 14R is not affected, and therefore the level of the output signal of the transistor 14R, which is the red color signal, is not varied by the detected luminance signal.

On the other hand, when the detected signal causes the connecting point 29 to be positive with respect to the voltage of the common circuit point between the resistors 32 and 33, the diode 34 becomes non-conductive and the voltage at the connecting point 29 can become more positive and in this way can affect the operation of the transistor 14R by being applied thereto through the resistor 37. This resistor is selected to reduce the gain of the transistor 14R when the level of the detected output signal at the emitter of the transistor 14R is higher than a level at which the electron beams in the cathode ray tube 19 reach a density that causes the blue and green color phosphors to saturate in luminosity. Under this condition, in which the level of the red color signal derived from the transistor 14R is reduced, the density of the electron beam that strikes the red color phosphor is reduced to maintain a balance of the luminescense from the red color phosphor in comparison with the luminescense of the blue and green color phosphors which are in the saturated condition. Deterioration in the color of the image on the screen of the tube 19 caused by differences between the luminosity saturation characteristics of the color phosphors is thus prevented.

In order to prevent the image from having a reddish cast at the sides, the output signal of the resonant circuits 26 and 27, which is identified by the reference numeral 30 and is shown in the first line of the waveforms in FIG. 3, is applied to the resistor 28. As shown in the second line of waveforms in FIG. 3, when this signal exceeds the level $L_a$, it causes the connecting point 29 to rise above the level $L_a$ as the diode 34 becomes non-conductive. This takes place during the interval $T_a$, which is divided into a section $T_a'$ at the beginning of each scanning line and is, therefore, at the left side of the image area of the phosphor screen, and a section $T_a''$, which is at the end of each line and is, therefore, at the right side of the image area. This signal, which is represented by reference numeral 36, is also applied to the resistor 37 to the emitter of the transistor 14R to reduce the output of the transistor 14R during the intervals $T_a'$ and $T_a''$ of each line but not to affect the output during the interval $T_b$. During the latter interval, the output of the transistor 14R may still be affected by the peak luminance signal detected by the peak detector 22 as described hereinabove.

Figure 4:
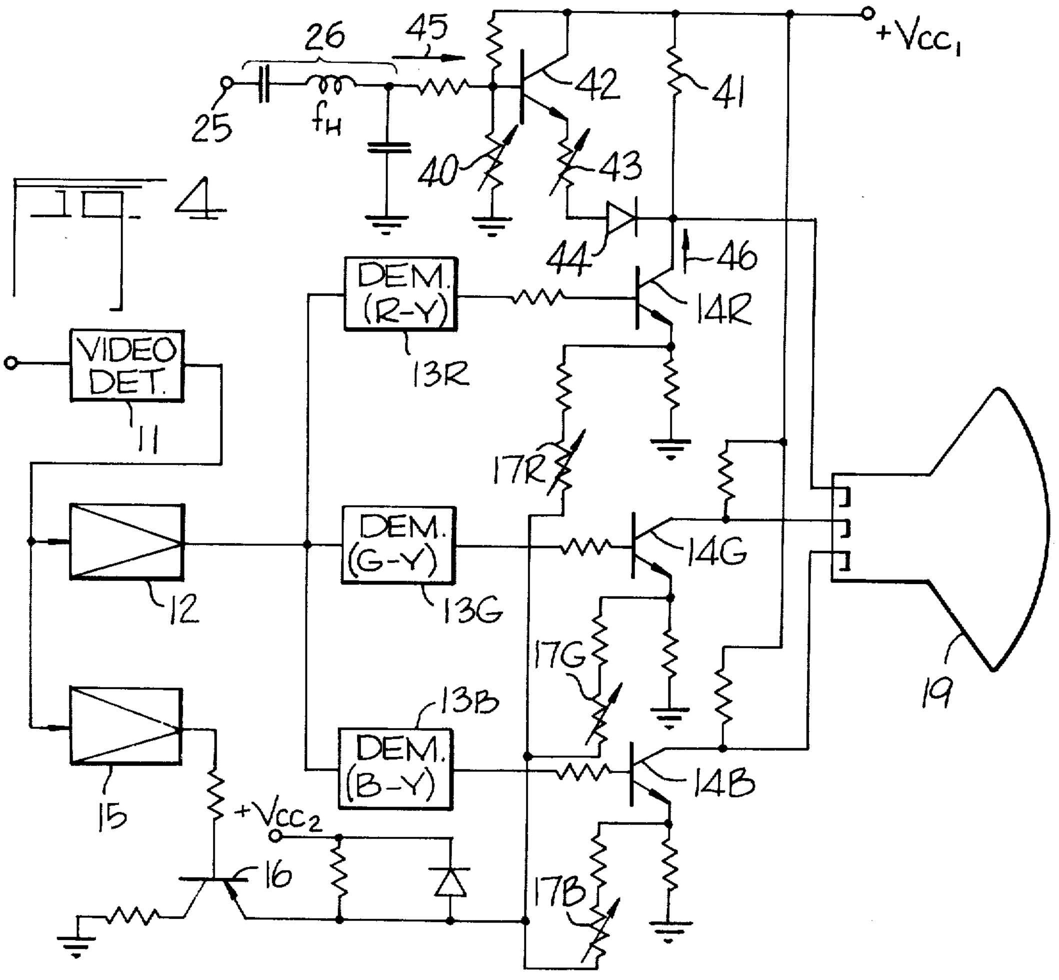
FIG. 4 is a schematic circuit diagram of another embodiment of a color signal control system according to the present invention.

FIG. 4 shows another embodiment of the invention in which many of the same components are used as the circuit in FIG. 2. These components are identified by the same reference numerals in both FIGS. 2 and 4.

In the circuit in FIG. 4, there is no peak detector for the luminance signal. Instead, the transistor 14R has a load impedance that includes a fixed resistor 41 and a variable impedance circuit connected in parallel with the resistor 41. The variable impedance circuit includes the emitter-collector circuit of a transistor 42 that has its operating point set by a voltage divider which includes a variable resistor 40 connected to the base of the transistor 42. The variable impedance circuit also includes a variable emitter load resistor 43 and a diode 44 connected in series with the emitter-collector circuit of the transistor 42.

In the operation of the circuit in FIG. 4, a composite color television signal is derived from the video detector 11. The chrominance signal portion is passed through the band pass amplifier 12 to the demodulators 13R, 13G, and 13B that feed the respective color difference signals to the bases of the transistors 14R, 14G, and 14B. The luminance portion of the composite color television signal passes through a band pass amplifier 15 to the emitter follower transistor 16, which then supplies the luminance signal through controllable resistors 17R, 17G, and 17B to the emitters of the respective output transistors 14R, 14G, and 14B.

A horizontal pulse signal applied to the terminal 25 is filtered by the resonant circuit 26 tuned to the fundamental frequency $f_H$ to produce a signal 45 shown in the third line of the graph in FIG. 3. This signal is applied to the base of the transistor 42. The red color signal at the collector of the transistor 14R, is indicated by reference numeral 46 in the third and fourth lines of waveforms in FIG. 3. As indicated, when the red color signal has a large amplitude, the level of the signal 45 is increased during the intervals $T_a'$ and $T_a''$, causing the base-emitter junction of the transistor 42 to be forward-biased, thus making the transistor 42 conductive. This reduces the effective collector load of the transistor 14R, so that the gain of that transistor becomes smaller.

During the interval $T_b$, the level of the signal 45 is lower than the level of the signal 46, so that the base-emitter junction of the transistor 42 is reverse-biased, and the transistor 42 is non-conductive. During that interval, the collector load impedance of the transistor 14R consists of only the resistor 41, and as a result, the gain of the transistor is increased. The resulting red color signal is shown in the fourth line of waveforms in FIG. 3, and this is the signal at the collector of the transistor 14R. During the intervals $T_a'$ and $T_a''$ corresponding to the side portions of the screen of the color cathode ray tube 19, when the level of the red color signal exceeds a predetermined value, it is automatically reduced in amplitude before it is applied to the cathode ray tube 19. The luminosity of the red color phosphor is thus reduced to maintain a proper color balance with the blue and green phosphors. The image on the screen is also prevented from having a redish cast at the side portions. The diode 44 is provided to protect the transistor 42 against breakdown due to excess reverse-bias between its base and emitter electrodes.

In the embodiments described, the level of the red color difference signal is controlled. However, the invention is equally applicable to controlling the level of either of the other color signals if the corresponding phosphor is less easily saturated.

It is also possible, in a condition in which at least one of the color phosphors saturates more easily than the others, to achieve a balanced luminosity by increasing the level of the color signal corresponding to that phosphor. Even if the phosphor saturates, its luminosity can increase slightly in response to an increase in the density of the electron beam impinging thereon, as may be understood by studying the curves 10R, 10B, and 10G in FIG. 1. Such operation, in which the amplification of one of the transistors 14R, 14G or 14B would be increased is simply the converse of the operation described hereinabove and is within the scope of the present invention. Also within the scope of the invention is the condition in which there is sufficient difference between the saturation characteristics of the three phosphors to make it desirable to apply correcting signals to two of the three transistors 14R, 14G, and 14B.

What is claimed is:

1. A signal control system comprising, in combination:

A. a color cathode ray tube comprising:
   1. a screen covering an image area and comprising an array of a plurality of groups of color phosphors emitting light of different colors, respectively, and
   2. a corresponding plurality of beam producing means for generating a plurality of electron beams directed toward said screen to impinge on respective ones of said groups of color phosphors;

B. a corresponding plurality of signal supplying circuit means responsive to incoming signals for supplying separate modulating signals to each of said beam producing means to modulate said respective electron beams in response to the respective levels of said modulating signals; and C. control circuit means connected to at least one of said signal supplying circuit means for controlling the level of the corresponding signal supplied to the corresponding beam producing means to vary the luminosity of the color phosphor corresponding to the electron beam modulated by said corresponding moulating signal when the density of said beams exceeds a predetermined level that causes luminosity saturation of at least one of said color phosphors that is easier to saturate than at least a second one of said color phosphors.

2. A signal control system according to claim 1, wherein said control circuit means comprises:

A. means for detecting the level of said incoming signals; and

B. means for supplying the detected output signal of said detecting means as a control signal to said signal supplying circuit means to reduce the level of a selected one of said modulating signals modulating the density of the electron beam corresponding to said second one of said color phosphors, thereby to reduce the luminosity of said second one of said color phosphors when the density of said beams exceeds said predetermined level to cause luminosity saturation of said one of said phosphors.

3. A signal control system according to claim 1, wherein said control circuit means comprises means for supplying said control signal to said signal supplying means to reduce the luminosity of said specific color phosphor at side portions of said image area in the line scanning direction of said beams.

4. A signal control system according to claim 1, wherein:

A. said signal supplying circuit means comprises a plurality of amplifiers, each connected to a corresponding one of said beam producing means and each amplifying one color component signal of said incoming signals to produce said modulating signals to be applied to the respective beam producing means; and B. said control circuit means includes means connected to at least one of said amplifiers to control the gain thereof when the level of said incoming signals exceeds a predetermined signal level corresponding to said predetermined level of density of said one of said beams.

5. A signal control system according to claim 4, wherein:

A. said signal supplying circuit means further comprises:

1. means for supplying a luminance signal to said amplifiers in parallel, and
2. means for supplying different chrominance signals to the respective ones of said amplifiers to derive a modulating signal from each of said amplifiers; and B. said control circuit means comprises:

1. means for detecting the level of said luminance signal, and
2. means for supplying the detected output of said luminance signal level detecting means to said one amplifier to control the gain of said one amplifier when the level of the luminance signal exceeds said predetermined signal level.

6. A signal control system according to claim 5, wherein said one amplifier supplies to said beam producing means a selected signal for modulating the density of the electron beam corresponding to a specific color phosphor which is hardest to saturate in luminosity and said control circuit means reduces the gain of said one amplifier when the level of the luminance signal exceeds said predetermined signal level.

* * * * *